United States Patent
MacLellan et al.

[19]

[11] Patent Number: 6,130,623
[45] Date of Patent: Oct. 10, 2000

[54] ENCRYPTION FOR MODULATED BACKSCATTER SYSTEMS

[75] Inventors: John Austin MacLellan, Freehold; Giovanni Vannucci, Middletown Township, Monmouth County, both of N.J.

[73] Assignee: Lucent Technologies Inc., Murray Hill, N.J.

[21] Appl. No.: 08/777,832

[22] Filed: Dec. 31, 1996

[51] Int. Cl.[7] .................................................. H04B 1/40
[52] U.S. Cl. ................................ 340/825.54; 340/825.54; 340/825.31; 455/38.2; 380/23; 380/2161 H; 380/2232 N
[58] Field of Search .................. 340/825.54, 825.31; 455/38.2; 380/2161 H, 2232 N, 23; 713/200, 201, 202

[56] References Cited

U.S. PATENT DOCUMENTS

| | | |
|---|---|---|
| 3,720,940 | 3/1973 | Fox et al. . |
| 3,938,052 | 2/1976 | Glasson et al. . |
| 3,944,928 | 3/1976 | Augenblick et al. . |

(List continued on next page.)

FOREIGN PATENT DOCUMENTS

| | | |
|---|---|---|
| WO9117515 | 11/1991 | Canada . |
| 0 313 491 A1 | 4/1989 | European Pat. Off. . |
| 0 346 922 A2 | 12/1989 | European Pat. Off. . |
| 0 670 558 A2 | 2/1995 | European Pat. Off. . |
| 0 724 35 A2 | 7/1996 | European Pat. Off. . |
| 0 724 351 A2 | 7/1996 | European Pat. Off. . |
| 0 732 597 A1 | 9/1996 | European Pat. Off. . |
| 0 750 200 | 12/1996 | European Pat. Off. . |
| WO 89/05549 | 6/1989 | Hague Agreement . |
| WO 94/19781 | 9/1994 | Hague Agreement . |
| 63-52082 | 3/1988 | Japan . |
| S63-52082 | 3/1988 | Japan . |
| 1 098 431 | 11/1982 | United Kingdom . |
| 2 193 359 | 2/1988 | United Kingdom . |
| 2 202 415 | 9/1988 | United Kingdom . |
| WO 94/19781 | 9/1994 | WIPO . |

OTHER PUBLICATIONS

"A Microwave Noncontact Identification Transponder Using Subharmonic Interrogation," Carol W. Pobanz, 8099 IEEE Transactions on Microwave Theory and Techniques, 43 (1995), July, No. 7, PT. II, New York, US, p. 1673–1679.
"A Coded Radar Reflector For Remote Identification of Personnel and Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20–22, 1993, ISBN 0–7803–0934–0, pp. 186–191.
"A Microwave Noncontact Identification Transponder Using Subharmonic Interrogation," Carol W. Pobanz, 8099 IEEE Transactions on Microwave Theory and Techniques, 43 (1995), Jul., No. 7, PT. II, New York, US, pp. 1673–1679.
"A Coded Radar Reflector For Remote Identification of Personnel and Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20–22, 1993, ISBN 0–7803–0934–0, pp. 186–191.
"A Microwave Noncontact Identification Transponder Using Subharmonic Interrogation," Carol W. Pobanz, 8099 IEEE Transactions on Microwave Theory and Techniques, 43 (1995), July, No. 7, PT. II, New York, US, pp. 1673–1679.

(List continued on next page.)

*Primary Examiner*—Brian Zimmerman
*Assistant Examiner*—Yves Dalencourt
*Attorney, Agent, or Firm*—Martin I. Finston; Irena Lager

[57] ABSTRACT

A tag and an interrogator exchange proprietary information using Modulated BackScatter (MBS) technology. A method for encrypting the RFID user's PIN and thereby making the interception and the subsequent illegal use of RFID accounts at least as difficult as a present day ATM cards. For example, the encryption method can be based upon the US Digital Encryption Standard (DES), either first or third level. The Tag's personal encryption key is only known by the financial database and the RFID Tag. This method can be applied to any type of financial, debt, identification, or credit card.

9 Claims, 3 Drawing Sheets

U.S. PATENT DOCUMENTS

| | | |
|---|---|---|
| 3,984,835 | 10/1976 | Kaplan et al. . |
| 3,997,847 | 12/1976 | Tong . |
| 4,068,232 | 1/1978 | Myers et al. . |
| 4,075,632 | 2/1978 | Baldwin et al. . |
| 4,360,810 | 11/1982 | Landt . |
| 4,471,345 | 9/1984 | Barrett, Jr. . |
| 4,510,495 | 4/1985 | Sigrimis et al. . |
| 4,584,534 | 4/1986 | Lijphart et al. . |
| 4,641,374 | 2/1987 | Oyama . |
| 4,656,463 | 4/1987 | Anders et al. . |
| 4,691,202 | 9/1987 | Denne et al. . |
| 4,739,323 | 4/1988 | Koelle et al. . |
| 4,739,328 | 4/1988 | Koelle et al. . |
| 4,816,839 | 3/1989 | Landt . |
| 4,827,395 | 5/1989 | Anders et al. . |
| 4,888,591 | 12/1989 | Landt et al. . |
| 4,912,471 | 3/1990 | Tyburski . |
| 4,937,581 | 6/1990 | Baldwin et al. . |
| 4,963,887 | 10/1990 | Kawashima et al. . |
| 4,993,068 | 2/1991 | Piosenka et al. . |
| 5,030,807 | 7/1991 | Landt et al. . |
| 5,039,994 | 8/1991 | Wash et al. . |
| 5,055,659 | 10/1991 | Hendrick et al. . |
| 5,086,391 | 2/1992 | Chambers . |
| 5,131,038 | 7/1992 | Puhl et al. . |
| 5,144,667 | 9/1992 | Pogue, Jr. et al. ................ 340/825.31 |
| 5,153,919 | 10/1992 | Reeds, III et al. . |
| 5,164,985 | 11/1992 | Nysen et al. . |
| 5,214,409 | 5/1993 | Beigel . |
| 5,214,410 | 5/1993 | Verster . |
| 5,227,803 | 7/1993 | O'Connor et al. . |
| 5,251,218 | 10/1993 | Stone et al. . |
| 5,252,979 | 10/1993 | Nysen . |
| 5,264,854 | 11/1993 | Spiess . |
| 5,264,954 | 11/1993 | Okada . |
| 5,305,008 | 4/1994 | Turner et al. . |
| 5,305,459 | 4/1994 | Rydel . |
| 5,317,309 | 5/1994 | Vercellotti et al. . |
| 5,339,073 | 8/1994 | Dodd et al. . |
| 5,347,263 | 9/1994 | Carroll et al. . |
| 5,381,137 | 1/1995 | Ghaem et al. . |
| 5,390,339 | 2/1995 | Bruckert et al. . |
| 5,400,949 | 3/1995 | Hirvonen et al. . |
| 5,420,757 | 5/1995 | Eberhardt et al. . |
| 5,423,056 | 6/1995 | Lindquist et al. . |
| 5,426,667 | 6/1995 | van Zon . |
| 5,434,572 | 7/1995 | Smith . |
| 5,448,110 | 9/1995 | Tuttle et al. . |
| 5,448,242 | 9/1995 | Sharpe et al. . |
| 5,455,575 | 10/1995 | Schuermann . |
| 5,461,385 | 10/1995 | Armstrong . |
| 5,463,402 | 10/1995 | Walrath et al. . |
| 5,477,215 | 12/1995 | Mandelbaum . |
| 5,479,160 | 12/1995 | Koelle . |
| 5,479,416 | 12/1995 | Snodgrass et al. . |
| 5,485,520 | 1/1996 | Chaum et al. . |
| 5,491,484 | 2/1996 | Schuermann . |
| 5,510,795 | 4/1996 | Koelle . |
| 5,521,944 | 5/1996 | Hegeler et al. . |
| 5,523,749 | 6/1996 | Cole et al. . |
| 5,525,993 | 6/1996 | Pobanz et al. . |
| 5,525,994 | 6/1996 | Hurta et al. . |
| 5,530,202 | 6/1996 | Dais et al. . |
| 5,543,798 | 8/1996 | Schuermann . |
| 5,559,828 | 9/1996 | Armstrong et al. . |
| 5,572,222 | 11/1996 | Mailandt et al. . |
| 5,581,576 | 12/1996 | Lanzetta et al. . |
| 5,590,158 | 12/1996 | Yamaguchi et al. . |
| 5,600,538 | 2/1997 | Xanthopoulos . |
| 5,610,939 | 3/1997 | Takahashi et al. . |
| 5,633,613 | 5/1997 | MacDonald . |
| 5,640,683 | 6/1997 | Evans et al. . |
| 5,649,295 | 7/1997 | Shober et al. . |
| 5,649,296 | 7/1997 | MacLellan et al. . |
| 5,686,920 | 11/1997 | Hurta et al. . |
| 5,686,928 | 11/1997 | Pritchett et al. . |
| 5,708,444 | 1/1998 | Pouwells et al. . |

OTHER PUBLICATIONS

"A Coded Radar Reflector For Remote Identification of Personnel and Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20–22, 1993, ISBN 0–7803–0934–0, pp. 186–191.

"Microwave Noncontact Identification Transponder Subharmonic Interrogation," Carol W. Pobanz, 8099 IEEE Transactions on Microwave Theory and Techniques, 43 (1995), July, No. 7, PT. II, New York, US, pp. 1673–1679.

"A Coded Radar Reflector For Remote Identification of Personnel and Vehicles," Frank R. Williamson, Lacey F. Moore, Ralph Brooks, Julie Anne Williamson, and Melvin C. McGee, Record of the 1993 IEEE National Radar Conference, Lynnfield, MA, USA, Apr. 20–22, 1993, ISBN 0–7803–0934–0, pp. 186–191.

"A Microwave Noncontact Identification Transponder Using Subharmonic Interrogation," Carol W. Pobanz, 8099 IEEE Transactions on Microwave Theory and Techniques, 43 (1995), July, No. 7, PT. II, New York, US, pp. 1673–1679.

"A Coded Radar Reflector For Remote Identification of Personnel and Vehicles," Frank R. Williamson, Lacey F. Moore, Ralph Brooks, Julie Anne Williamson, and Melvin C. McGee, Record of the 1993 IEEE National Radar Conference, Lynnfield, MA, Apr. 20–22, 1993, ISBN 0–7803–0934–0, pp. 186–191.

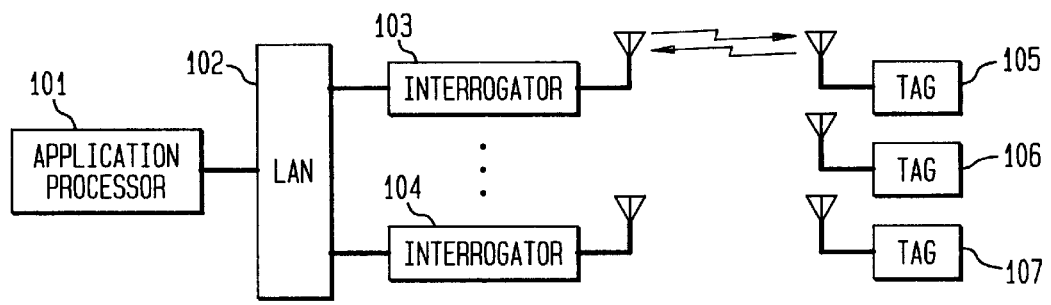
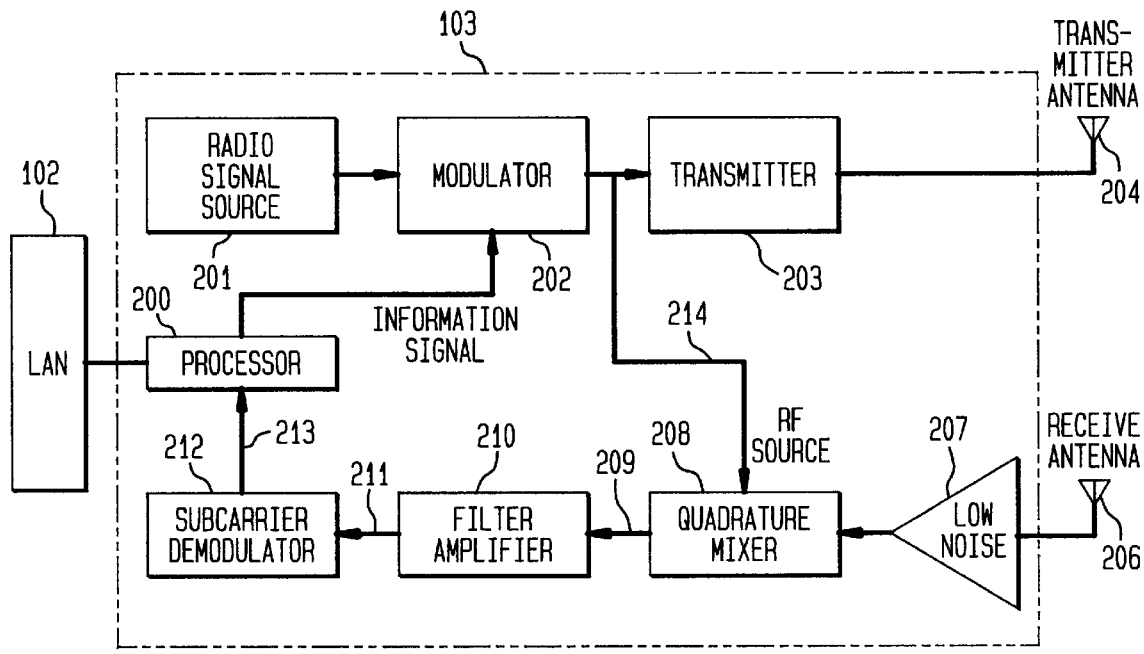

ENCRYPTION FOR MODULATED BACKSCATTER SYSTEMS

FIELD OF THE INVENTION

This invention relates to wireless communication systems and, more particularly, to a wireless communication system which uses digital encryption encoding to ensure secure transmission of private information using modulated backscatter technology.

RELATED APPLICATIONS

START Related subject matter is disclosed in the following U.S. patent applications assigned to the Assignee hereof: U.S. patent application Ser. No. 08/571,004, filed Dec. 12, 1995, by MacLellan et al. and entitled "Enhanced Uplink Modulated Backscattering System;" U.S. patent application Ser. No. 08/492,174, filed Jun. 19, 1995, by MacLellan et al. and entitled "Full Duplex Modulated Backscattering System;" and U.S. patent application Ser. No. 08/492,173, filed Jun. 19, 1995, by Shober et al. and entitled "Dual Mode Modulated Backscatter System." END Related subject matter is disclosed in the following applications filed concurrently herewith and assigned to the same Assignee hereof: U.S. patent applications "Shielding Technology In Modulated Backscatter System," Ser. No. 08/777,770 now abandoned; "QPSK Modulated Backscatter System," Ser. No. 08/775,694; "Modulated Backscatter Location System," Ser. No. 08/777,643; "Antenna Array In An RFID System," Ser. No. 08/775,217; "Subcarrier Frequency Division Multiplexing Of Modulated Backscatter Signals," Ser. No. 08/777,834; "IQ Combiner Technology In Modulated Backscatter System," Ser. No. 08/775,695; "In-Building Personal Pager And Identifier," Ser. No. 08/775,738; "In-Building Modulated Backscatter System," Ser. No. 08/775,701; "Inexpensive Modulated Backscatter Reflector," Ser. No. 08/774,499; "Passenger, Baggage, And Cargo Reconciliation System," Ser. No. 08/782,026. Related subject matter is also disclosed in the following applications assigned to the same assignee hereof: U.S. patent application Ser. No. 08/504,188, entitled "Modulated Backscatter Communications System Having An Extended Range"; U.S. patent application Ser. No 08/492,173, entitled "Dual Mode Modulated Backscatter System,"; U.S. patent application Ser. No. 08/492,174, entitled "Full Duplex Modulated Backscatter System,"; and U.S. patent application Ser. No. 08/571,004, entitled "Enhanced Uplink Modulated Backscatter System" "Modulated Backscatter Sensor System", Ser. No. 08/777,771.

BACKGROUND OF THE INVENTION

Radio Frequency IDentification (RFID) systems are used for identification and/or tracking of equipment, inventory, or living things. RFID systems are radio communication systems that communicate between a radio transceiver, called an Interrogator, and a number of inexpensive devices called Tags. In RFID systems, the Interrogator communicates to the Tags using modulated radio signals, and the Tags respond with modulated radio signals. The Interrogator first transmits an amplitude modulated signal to the Tag. Then, the Interrogator transmits a Continuous-Wave (CW) radio signal to the Tag. The Tag then modulates the CW signal, using Modulated BackScattering (MBS), where the antenna is electrically switched, by the Tag's modulating signal, from being an absorber of RF radiation to being a reflector of RF radiation; thereby encoding the Tag's information onto the CW radio signal. The Interrogator demodulates the incoming modulated radio signal and decodes the Tag's information message.

Over the next decade an enormous growth in the number and proliferation of RFID applications is expected. Many emerging applications will be of a financial nature and will require, for example, that a user's Personal Identification Number (PIN) cannot be intercepted by a hostile eavesdropper. The cellular phone industry is presently under siege by network pirates and industry losses are quoted to be approaching one billion dollars annually. So as not to repeat this particular failing of the cellular industry, RFID system designers should consider network security a top priority. There are three major security issues when transferring data in a wireless system:

1. A legitimate Tag and a legitimate Interrogator are involved in a communication session transferring sensitive data that a hostile eavesdropper would like to intercept.

2. A legitimate Interrogator would be queried by a fraudulent Tag trying to obtain service, such as to acquire data stored in the network or in an Application Processor. (This is similar to the case of someone stealing cellular air time.)

3. A legitimate Tag would be queried by a fraudulent Interrogator trying to acquire data stored in the Tag's memory (like stealing the PIN number from a cellular telephone).

This invention discloses a method for encrypting both the data in a Tag's memory and the data stored in an Application Processor, where by transferring only ciphered data between network endpoints, one can thwart all three security breaches outlined above. This method encrypts the RFID user's PIN and therefore makes the interception and the subsequent illegal use of RFID data at least as difficult as for present day ATM cards. The encryption method can be based upon the US Digital Encryption Standard (DES), either first or third level. The Tag's personal encryption key is only known by the financial database and the RFID Tag. This method can be applied to any type of financial, debt, identification or credit card.

SUMMARY OF THE INVENTION

In accordance with the present invention, a MBS radio communication system comprises an Interrogator which generates a first modulated signal by modulating a first information signal onto a radio carrier signal. The Interrogator transmits the first modulated signal to at least one remote Tag of the system. The remote Tag receives and processes the received first modulated signal. A second information signal backscatter-modulates the reflection of the first modulated signal, the reflected signal being a second modulated signal. The Interrogator receives and demodulates the second modulated signal to obtain the second information signal. In one embodiment, demodulation utilizes a homodyne detector and the first modulated signal as the local oscillator source for the homodyne detector. In another embodiment, the second information signal is modulated onto a subcarrier, which is then backscatter-modulated onto the first modulated signal. The Interrogator communicates the second information signal to an Application Processor; the second information signal contains private information known only to the Tag and to the Application Processor. Both the Tag and Application Processor use digital encryption techniques to cipher the end-to-end communications of the private information.

The present disclosure outlines three levels of security for which, depending on the RFID application, an Application Processor, at least one Interrogator, and at least one Tag can exchange information: The first level is the "Normal" mode, where a Tag and Interrogator exchange the RFID of the Tag.

The second level is to transmit and detect a "secure" RFID between a Tag and Application Processor, using the Interrogator as a "wireless-to-wireline" converter. The third level is the transfer of secure messages between a Tag and Application Processor. This can include downloading new information to a Tag; this is a "Read/Write" Tag where the data stored in memory is sensitive, i.e., cash stored on a debit card.

BRIEF DESCRIPTION OF THE DRAWING

In the drawing,

FIG. 1 shows a block diagram of an illustrative Radio Frequency Identification (RFID) system;

FIG. 2 shows a block diagram of an illustrative Interrogator Unit used in the RFID system of FIG. 1;

DETAILED DESCRIPTION

One class of RFID applications involves using RFID technology to read information from a Tag affixed to a container or pallet. In this application, the container is moved across the reading field of an Interrogator. The reading field is defined as that volume of space within which a successful transaction can take place. While the Tag is in the reading field, the Interrogator and Tag must complete their information exchange before the Tag moves out of the Interrogation field. Since the Tag is moving through the reading field, the RFID system has only a limited amount of time to successfully complete the transaction.

Normal Mode

With reference to FIG. 1, there is shown an overall block diagram of an illustrative RFID system useful for describing the application of the present invention. An Application Processor 101 communicates over Local Area Network (LAN) 102 to a plurality of Interrogators 103–104. The Application Processor and the Interrogator functions may be present in the same device, or separate. In this disclosure we refer to the logical functions performed by each device. The Interrogators may then each communicate with one or more of the Tags 105–107. For example, the Interrogator 103 receives an information signal, typically from an Application Processor 101. The Interrogator 103 takes this information signal and Processor 200 (FIG. 2) properly formats a downlink message (Information Signal 200a) to be sent to the Tag. With joint reference to FIGS. 1 and 2, Radio Signal Source 201 generates a radio signal, the Modulator 202 modulates the Information Signal 200a onto the radio signal, and the Transmitter 203 sends this modulated signal via Antenna 204, illustratively using amplitude modulation, to a Tag. The reason amplitude modulation is a common choice is that the Tag can demodulate such a signal with a single, inexpensive nonlinear device (such as a diode).

Figure 3:
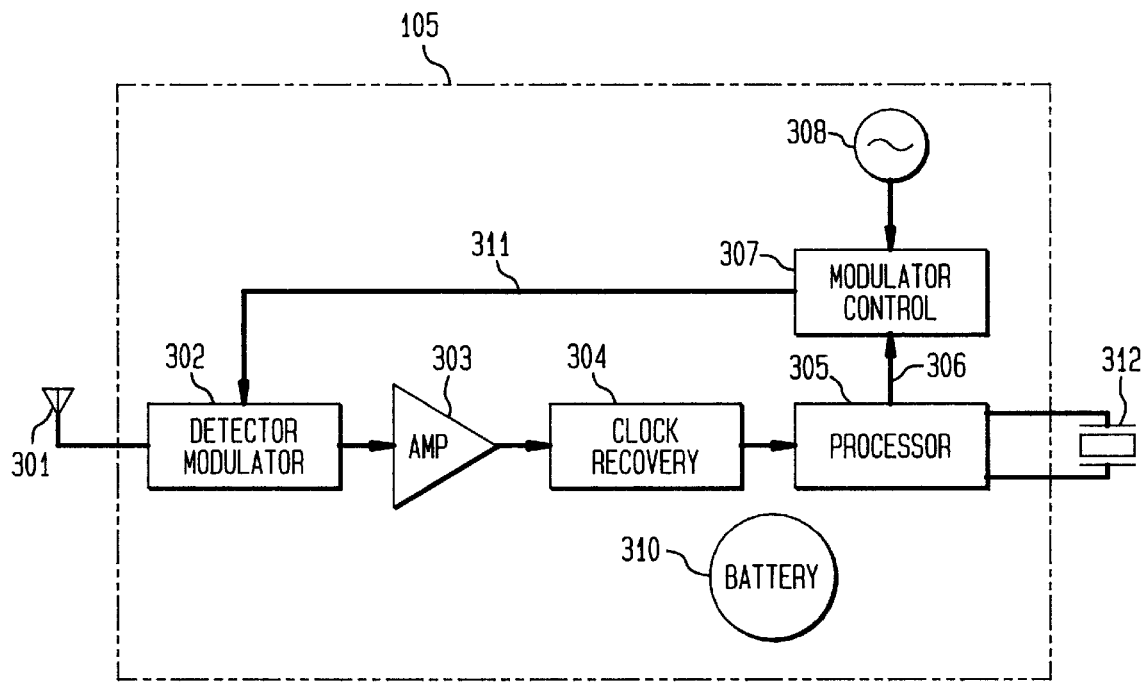
FIG. 3 shows a block diagram of a Tag Unit used in the RFID system of FIG. 1.

In the Tag 105 (see FIG. 3), the Antenna 301 (frequently a loop or patch antenna) receives the modulated signal. This signal is demodulated, directly to baseband, using the Detector/Modulator 302, which, illustratively, could be a single Schottky diode. The diode should be appropriately biased with the proper current level in order to match the impedance of the diode and the Antenna 301 such that losses of the radio signal are minimized. The result of the diode detector is essentially a demodulation of the incoming signal directly to baseband. The Information Signal 200a is then amplified, by Amplifier 303, and synchronization recovered in Clock and Frame Recovery Circuit 304. The Clock Recovery Circuit 304 can be enhanced by having the Interrogator send the amplitude modulated signal using Manchester encoding. The resulting information is sent to a Processor 305. The Processor 305 is typically an inexpensive 8-bit microprocessor; the Clock Recovery Circuit 304 can be implemented in an ASIC (Application Specific Integrated Circuit) which works together with Processor 305. The Processor 305 generates an Information Signal 306 to be sent from the Tag 105 back to the Interrogator (such as Interrogator 103). This Information Signal 306 (under control of Clock Recovery and Frame synchronization 304) is sent to a Modulator Control Circuit 307, which uses the Information Signal 306 to modulate a subcarrier frequency generated by the subcarrier Frequency Source 308. The Frequency Source 308 could be a crystal oscillator separate from the Processor 305, or it could be a frequency source derived from signals present inside the Processor 305, such as a divisor of the primary clock frequency of the Processor. The Modulated Subcarrier Signal 311 is used by Detector/Modulator 302 to modulate the modulated signal received from Tag 105 to produce a modulated backscatter signal, also referred to herein as a reflected signal. This is accomplished by switching on and off the Schottky diode using the Modulated Subcarrier Signal 311, thereby changing the reflectance of Antenna 301. A Battery 310 or other power supply provides power to the circuitry of Tag 105.

Secure Mode

Figure 4:
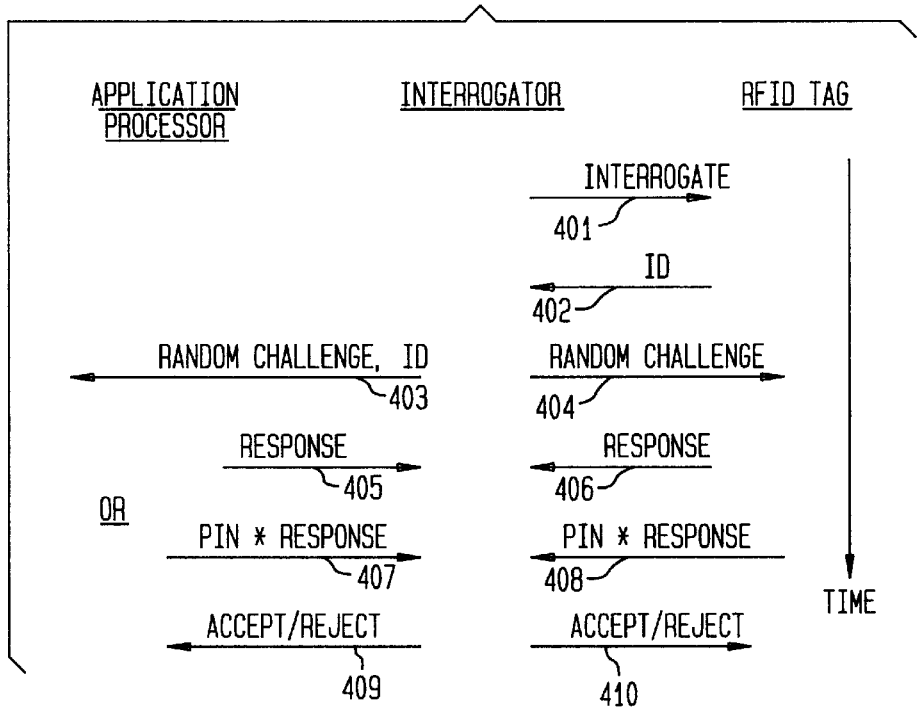
FIG. 4 shows the flow of information between the Tag, Interrogator and the Application Processor vs. time during a secure message transfer.

The present invention enables a Tag and Interrogator to exchange proprietary information using MBS technology. FIG. 4 shows the exchange of information over time between a Tag, Interrogator and the Application Processor using digital encryption techniques. The Interrogation of a Tag can be initiated merely by a Tag coming into Radio Frequency (RF) proximity of the Interrogator, depending on the exact service or specific application. In any case, the Tag senses the Interrogator's signal 401 and broadcasts its RFID 402. The Interrogator, which has no knowledge of the Tag's PIN or encryption key, sends the information along to the Application Processor, as identified by the type of ID number presented by the Tag. The Interrogator also generates a random number which it passes to both the Tag and Application Processor. The random number is chosen by the Interrogator 103 and is previously unknown to both the Tag and Application Processor. The Application Processor in turn looks up the appropriate identification information and, using the encryption information associated with the Tag's ID information, generates a response that is functionally based upon the RFID user's PIN (encryption key) and the random number sent by the Interrogator 405. Subsequently the Interrogator has also sent the same random number back to the Tag 404 and expects the same functionally based response 406. In this scenario, further transactions are allowed to continue between the Tag and Application Processor, through the Interrogator, only if the Processor and Tag return the same response to the random query. In this case, the Interrogator notifies the Tag and the Application Processor whether the transaction is accepted or rejected 409, 410. Note that in this scenario, no information about the Tag's PIN or encryption key has been transmitted anywhere in the network. The encryption key is only known by the Tag and Application Processor, which are distributed when the Tag is issued. Also, all data is encrypted before transmission on any part of the network. The only information that is not protected is the Tag's ID number, which by itself is not useful to an eavesdropper and is treated as public information. Therefore, all three security issues outlined above are addressed by this method of user authentication and subsequent data transmission.

Figure 5A:
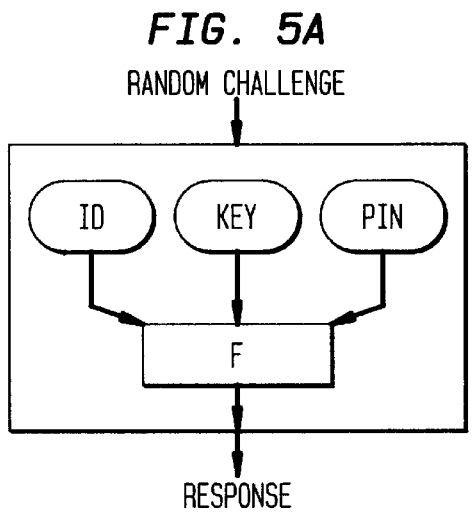
FIG. 5 shows a block diagram of how a Tag's processor and the Application Processor processor calculate the random query response.
Figure 5B:
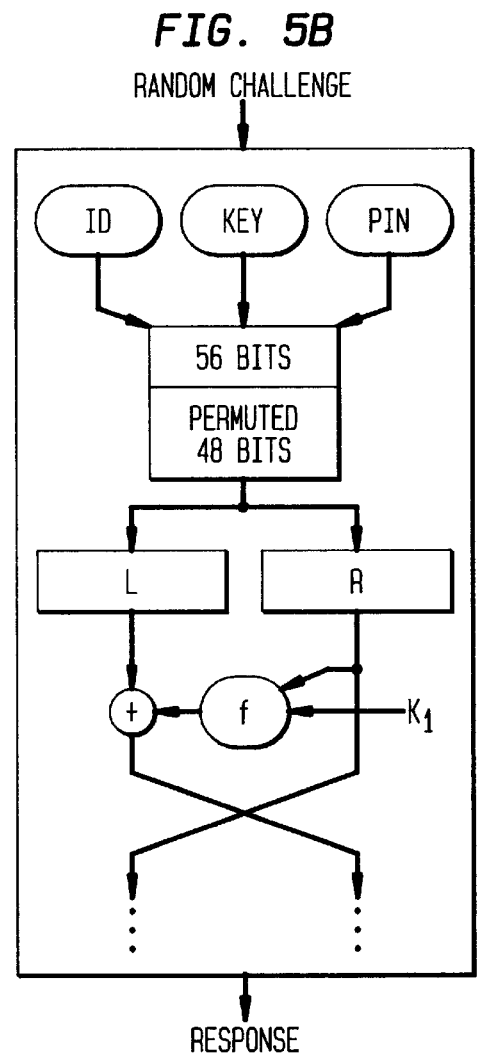

The security provided by the encryption method outlined here is that the response to the Interrogator's random number is based on a "one-way function" which produces the appropriate response. A one-way function is characterized by the fact that an eavesdropper that sees the output of the function cannot reconstruct the input (the secret PIN, in this case) even knowing the particular function. Both the Application Processor and the Tag use the same function, which is determined by the encryption key, to cipher and decipher the information data. FIG. 5a shows a Tag, using a one way function, calculating the response to a random query. In FIG. 5b, the "first round" of a DES encryption process is shown. In a DES level one code, there are 16 coding rounds to encrypt 64 bits of data. The exact function is unique to each user's database entry since it depends on the particular user's encryption key. For example, with today's technology, a 64 bit PIN can be encrypted using a DES level one function by a 8 bit microprocessor in approximately 1 ms. Thus it is a cost effective way to implement digital encryption and still be able to manufacture simple and cheap RFID Tags.

It is important to design system security that will be effective over the entire lifetime of the RFID system. As pointed out above, cellular network designers did not foresee the technical advancements and cost reductions of RF measurement equipment and the proliferation of cheap, powerful and portable computers. Therefore, one issue that must be addressed is what level of security can the MBS system provide against future attacks? Another implementation issue that will greatly effect the time response of the RFID system are the network and processing delays of the RF air interface and the connection to the authentication/transaction database.

Secure Messages

Figure 6:
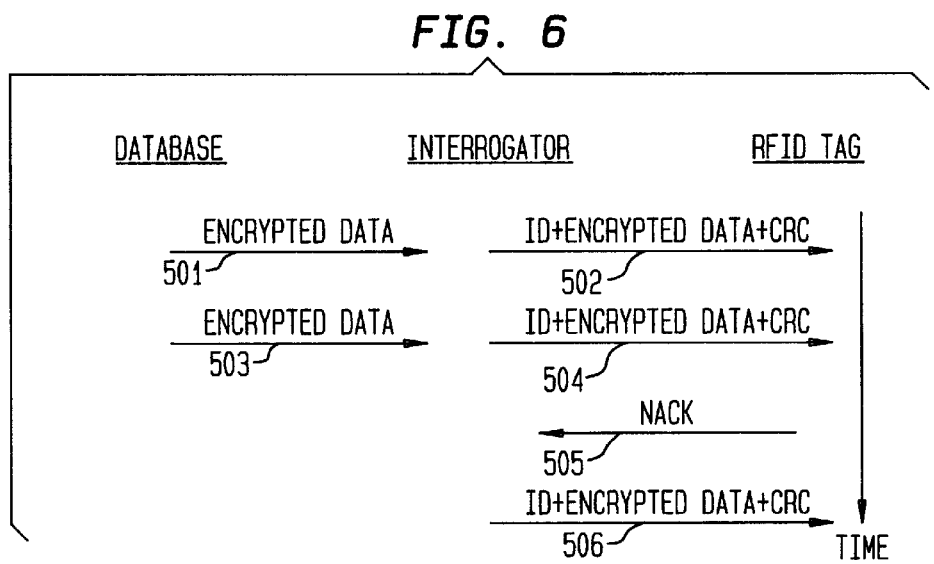
FIG. 6 shows the flow of information between the Applications Processor, the Interrogator, and at least one Tag, where the Applications Processor is writing new information to the Tag's memory.

The previous example (FIG. 4) demonstrates how a Tag can exchange sensitive information with an Application Processor. FIG. 6 shows how the Application Processor can change the information stored on a Read/Write RFID Tag. After the completion of the Tag authentication procedures described above, the Application Processor may find it necessary to change the information stored on the Tag. (For example, the remaining total on a debit card or the air waybill on an airline cargo container.) In this case the Application Processor will digitally encrypt all the command messages and information messages with the "encryption key" of the particular Tag. After completing all of the data transmission, the Tag will decrypt all of the new data and store it in memory. However, the RF channel is an unreliable medium and will generally create errors in the data transmission stream. Since only the endpoints of the network have the ability to decipher the information, unnecessary delay would be added if data, corrupted by wireless transmission, would need to be retransmitted between the endpoints. Since the Interrogator only has knowledge of the Tag's ID and not the PIN or encryption key, it needs a mechanism to ensure the Tag has received all the information correctly when transmitting over the radio channel.

Therefore, the Interrogator should add error detection and/or forward error correction coding to the transmitted data. This will allow any needed retransmissions to be only between the Tag and Interrogator, thereby reducing retransmission latency. For example, the Interrogator can calculate and add a CRC byte or bytes to the end of each transmitted packet, allowing both error detection and limited error correction. The Tag will in turn calculate the CRC for each received message packet and only ask for retransmission of corrupted packets.

Therefore, it is possible to send encrypted data between the Application Processor and a Tag without the need to pass encryption keys (PINs) over the wireless air interface. Since all data is encrypted before transmission to the Interrogator over the wired line, this method provides end-to-end security for the MBS system.

This leads to two immediate advantages: First, different applications can use different encryption algorithms, which can depend on the level of security the application needs or the maximum delay time an application can tolerate during information exchange. Since only the end points cipher, the data can be a priori encrypted and stored in memory thereby reducing latency. Second, as computers and microprocessors, the tools used by hostile eavesdroppers, become more powerful, the encryption algorithms can gracefully be updated by each generation release of the MBS system. Since only the Tag and the particular Application Processor entry for the Tag need to be updated, there is no need to modify any other parts of the MBS system.

Using the above techniques as an example, an inexpensive, short-range, bi-directional digitally encrypted radio communications channel is implemented. Implementation is made inexpensive by using, e.g., such Tag components as a Schottky diode, an amplifier to boost the signal strength, bit and frame synchronization circuits, an inexpensive 8-bit microprocessor, subcarrier generation circuits, and a battery. Most of these items are already manufactured in quantities of millions for other applications, and thus are not overly expensive.

The present invention outlines three levels of security for which, depending on the RFID application, an Application Processor, at least one Interrogator and at least one Tag can exchange information: The first level is the "Normal" mode, where a Tag and Interrogator exchange the RFID of the Tag. The second level is to transmit and detect a "secure" RFID between a Tag and Application Processor, using the Interrogator as a "wireless-to-wiredline" converter. The third level is the transfer of secure messages between a Tag and Application Processor. This can include downloading new information to a Tag; this is a "Read/Write" Tag where the data stored in memory is sensitive, such as cash stored on a debit card.

What has been described is merely illustrative of the application of the principles of the present invention. Other arrangements and methods can be implemented by those skilled in the art without departing from the spirit and scope of the present invention.

The invention claimed is:

1. A method of radio communication, comprising:
   transmitting a radio signal from an interrogator to a tag;
   in the tag, modulating a reflection of the radio signal using, at least in part, a unique identifier, thereby forming a reflected radio signal modulated by the unique identifier;
   in the interrogator, receiving and demodulating the reflected radio signal modulated by the unique identifier, thereby recovering the unique identifier;

in the interrogator, generating a random challenge, and transmitting the random challenge and the unique identifier to an application processor; and in the interrogator, modulating the radio signal using the random challenge, thereby forming a radio signal modulated by the random challenge, and transmitting to the tag the radio signal modulated by the random challenge.

2. The method of claim 1, further comprising:

in the tag, modulating the reflection of the radio signal using an encrypted signal, thereby forming a reflected radio signal modulated by the encrypted signal;

in the interrogator, receiving and demodulating the reflected radio signal modulated by the encrypted signal, thereby obtaining the encrypted signal; and transmitting the encrypted signal to the application processor.

3. The method system of claim 2, further comprising:

in the tag, generating a subcarrier signal, and modulating the subcarrier signal using the encrypted signal, thereby forming a subcarrier signal modulated by the encrypted signal; and the step of modulating the reflection of the radio signal using the encrypted signal is carried out using the subcarrier signal modulated by the encrypted signal.

4. The method of claim 2, further comprising, in the application processor:

a deciphering the encrypted signal, thereby generating an information signal; and storing the information signal.

5. The method of claim 1, further comprising:

in the application processor, generating a first encrypted response using at least the random challenge and the unique identifier;

transmitting the first encrypted response to the interrogator;

in the tag, generating a second encrypted response using at least the random challenge, and modulating the reflection of the radio signal using the second encrypted response, thereby forming a reflected radio signal modulated by the second encrypted response;

in the interrogator, receiving the first encrypted response from the application processor, demodulating the reflected radio signal modulated by the second encrypted response to recover the second encrypted response, and comparing the first and second encrypted responses; and indicating acceptance or rejection of the result of the comparing step.

6. The method of claim 1, further comprising:

in the tag, generating a subcarrier signal, and modulating the subcarrier signal using the unique identifier, thereby forming a subcarrier signal modulated by the unique identifier;

and in the tag, the step of modulating the reflection of the radio signal using, at least in part, the unique identifier is carried out by using the subcarrier signal modulated by the unique identifier.

7. The method of claim 1, further comprising:

transmitting an encrypted information signal from the application processor to the interrogator;

in the interrogator, adding the unique identifier to the encrypted information signal, thereby forming an addressed information signal;

adding cyclic redundant check coding to the addressed information signal, thereby forming a message signal;

modulating the radio signal with the message signal, thereby forming a radio signal modulated by the message signal;

transmitting the radio signal modulated by the message signal to the tag;

in the tag, demodulating the radio signal modulated by the message signal, thereby recovering the message signal;

in the tag, calculating and removing the cyclic redundant check code from the message signal, thereby recovering the addressed information signal;

in the tag, removing the unique identifier from the addressed information signal, thereby recovering the encrypted information signal; and in the tag, storing the encrypted information signal.

8. The method of claim 7, further comprising:

in the tag, decrypting the encrypted information signal, thereby forming unencrypted information; and storing the unencrypted information.

9. The method of claim 7, further comprising:

in the tag, determining whether there are transmission errors based upon the cyclic redundant check coding, and generating a negative acknowledgment signal when there are transmission errors;

in the tag, modulating the reflection of the radio signal using the negative acknowledgment signal, thereby forming a reflected radio signal modulated by the negative acknowledgement signal;

in the interrogator, demodulating the reflected radio signal modulated by the negative acknowledgement signal, thereby recovering the negative acknowledgment signal;

deciding, based on the contents of the negative acknowledgment signal, whether retransmission should occur; and modulating the radio signal with the message signal, thereby forming the radio signal modulated by the message signal;

transmitting to the tag the radio signal modulated by the message signal.

* * * * *